Nov. 7, 1961 J. SALTZ 3,008,054

SIGNAL-RESPONSIVE CIRCUIT

Filed Dec. 23, 1953 3 Sheets-Sheet 1

INVENTOR.

Julian Saltz

BY Morris A. Rabkin

ATTORNEY

Nov. 7, 1961 J. SALTZ 3,008,054

SIGNAL-RESPONSIVE CIRCUIT

Filed Dec. 23, 1953 3 Sheets-Sheet 2

INVENTOR.
Julian Saltz

BY Morris A. Rabkin

ATTORNEY

Nov. 7, 1961 J. SALTZ 3,008,054

SIGNAL-RESPONSIVE CIRCUIT

Filed Dec. 23, 1953 3 Sheets-Sheet 3

INVENTOR.

Julian Saltz

BY Morris A. Rabkin

ATTORNEY

United States Patent Office 3,008,054

Patented Nov. 7, 1961

3,008,054

SIGNAL-RESPONSIVE CIRCUIT

Julian Saltz, Philadelphia, Pa., assignor to Radio Corporation of America, a corporation of Delaware Filed Dec. 23, 1953, Ser. No. 400,023
24 Claims. (Cl. 307—88)

This invention relates to signal responsive circuits, and particularly to a signal responsive circuit employing magnetic cores.

In a static magnetic memory of the type described in articles by Jan A. Rajchman, entitled "Static Magnetic Matrix Memory and Switching Circuits," RCA Review, June 1952, p. 183 and "A Myriabit Magnetic-Core Matrix Memory," Proceedings of the I.R.E., October 1953, p. 1407, and in the copending patent application of Jan A. Rajchman, Serial No. 275,621, now U.S. Patent 2,691,154, entitled "Magnetic Information Handling System," the output signals may be in the form of positive and negative pulses. Although of opposite polarity, the pulses represent the same information. The output signals may be utilized in various circuits which are responsive only to standard signals of a single polarity. The same situation of opposite polarity signals representing the same information may arise in other circuits of electronic computers or information handling machines. It is, therefore, desirable to mark the presence of pulses of different polarities by uniform signals.

Electron tube circuits for marking pulses of different polarities by uniform signals are known in the art. However, it is desirable to use magnetic cores rather than electron tubes as the basic circuit element of a pulse marking circuit, because magnetic cores offer the advantages of unlimited life, small size, and small power-supply requirements.

An object of this invention is to provide a new and improved signal responsive marking circuit employing magnetic cores.

Another object of this invention is to provide a new and improved circuit employing magnetic cores for marking the presence of a pulse.

Another object of this invention is to provide a simple pulse marking circuit employing magnetic cores that is economical in the components and power required.

Another object of this invention is to provide a simple, reliable and economical circuit employing magnetic cores for producing uniform signals in response to signals of opposite polarities.

In accordance with one form of the present invention, two magnetic cores are employed that have substantially rectangular hysteresis characteristics. An input coil has windings linked to both cores. An inhibiting coil also has windings linked to both cores. A biasing current in the inhibiting coil produces substantially equal bias magnetomotive forces of saturation magnitude in both cores. An output coil has windings linked to both cores and is connected to a utilization device. The inhibiting and input windings linked to a first one of the cores have opposite senses of linkage; and the inhibiting and input windings linked to the second core have the same sense of linkage. The sense of coil linkage is the same as the polarity of the magnetomotive force induced in the magnetic core, and it is determined by the physical direction of coil winding and the polarity of the inducing current. The input and output coil windings on one and the other cores have the same sense of linkage and opposite senses of linkage respectively.

The cores may be considered as being magnetized to opposite states of saturation. The input windings, therefore, have the same winding directions. If an input current pulse of one polarity and of amplitude corresponding to a saturating magnetomotive force is applied to the input coil, the biasing magnetomotive force of the first core is overcome. Therefore, the state of saturation of the first core is reversed, while the second core remains substantially unchanged. A pulse of one polarity is induced in the first core output coil winding. Upon termination of the input pulse, the biasing magnetomotive force returns the first core to its initial state, and a pulse of opposite polarity is induced in the first core output coil winding. If the input pulse is of opposite polarity, the second core state is reversed and the first core is substantially unchanged. The output coil pulses have the same polarities as those in the first example, due to the relative senses of linkage of the coil windings on the two cores.

In a second embodiment of the invention, a gating coil is linked to both cores, the gating coil windings and the inhibiting coil windings on the same cores having opposite senses of linkage. The input, output and inhibiting coils are the same as in the first embodiment. The input pulse amplitude is of saturating amplitude, as in the first embodiment, and the biasing magnetomotive force is greater by an amount equal to the magnetomotive force produced by a gating current pulse. A gating pulse or an input pulse separately are of insufficient amplitude to produce a substantial effect on the biased state of a core. However, when two pulses coincide, the combined magnetomotive force is sufficient to reverse the saturation state of a core. The operation is otherwise the same as the first embodiment. With a gated pulse marking circuit, desired pulses may be gated through the circuit, and undesired pulses may be blocked.

The foregoing and other objects, the advantages and novel features of this invention, as well as the invention itself both as to its organization and mode of operation, may be best understood when read together with the accompanying drawing in which like reference numerals refer to like parts and in which FIGURE 1 is a schematic circuit diagram of one embodiment of the invention;

Figure 4:
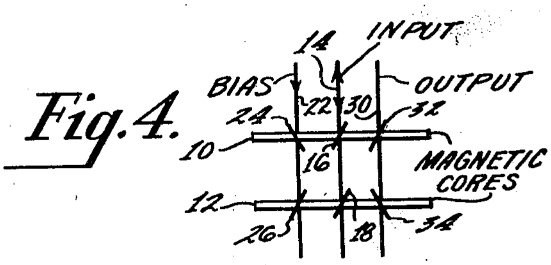
FIGURE 4 is a diagrammatic representation of the polarities of the windings and currents in the circuit of FIGURE 1.
Figure 4A:
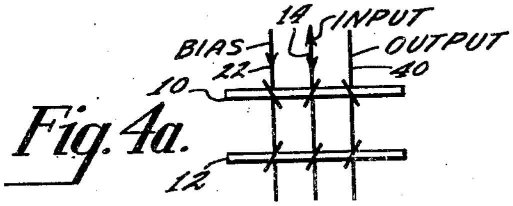
Figure 5:
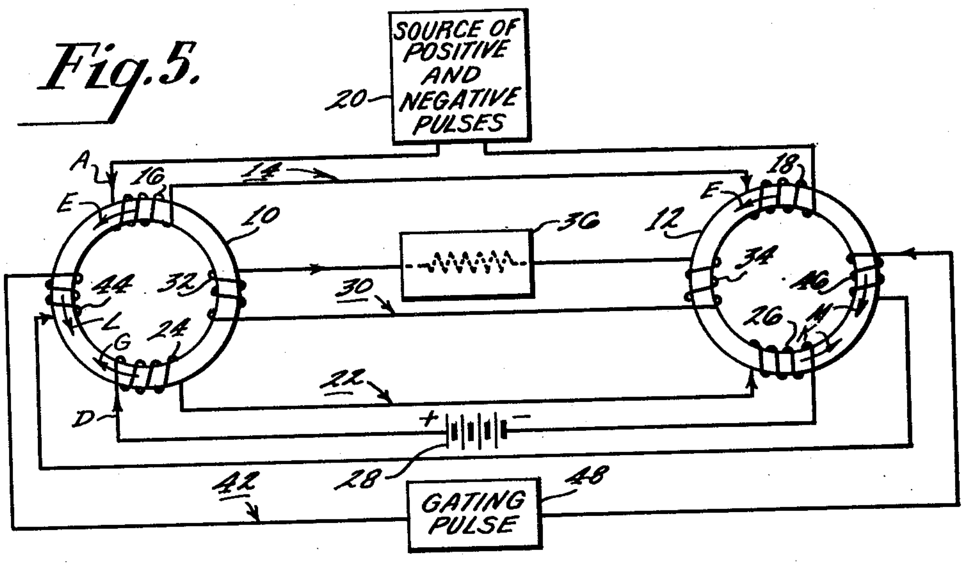
Figure 6:
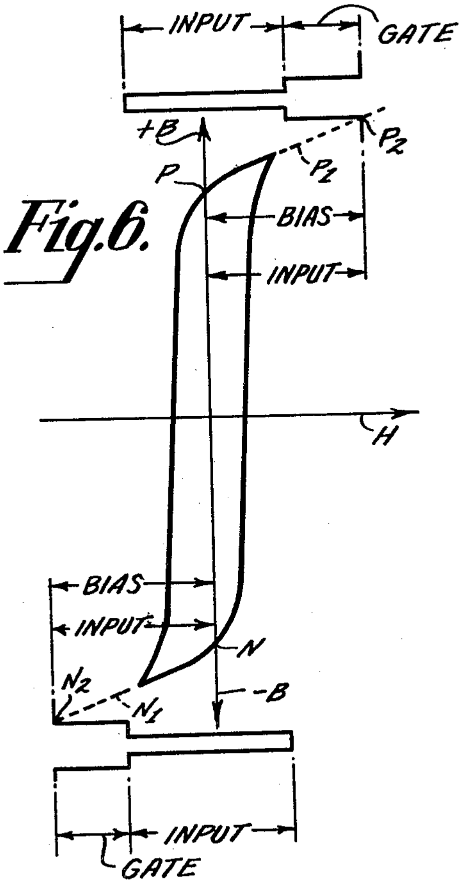
Figure 7:
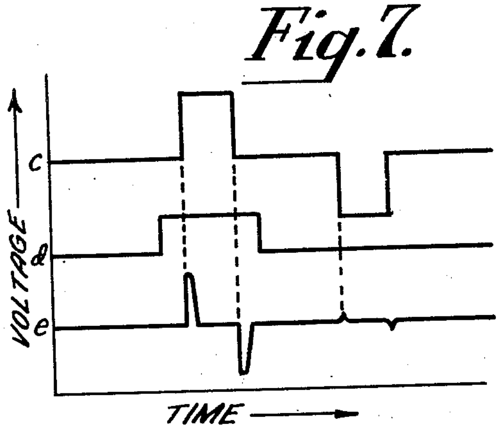
Figure 8:
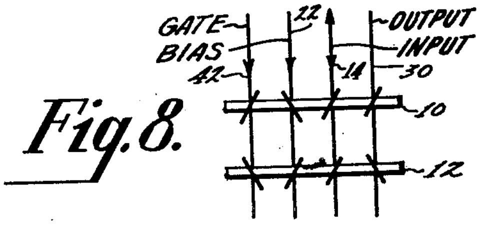
Figure 9:
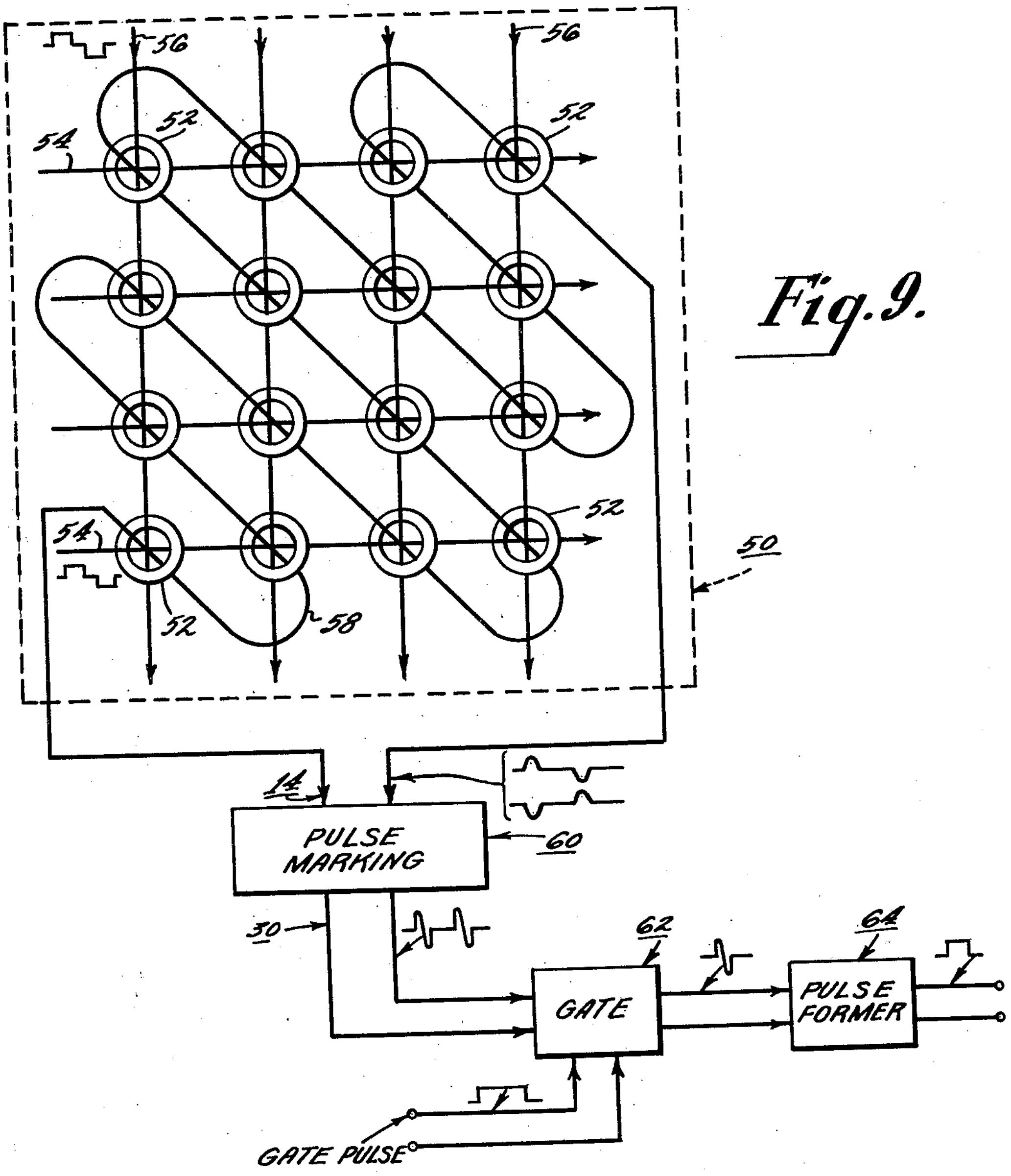

FIGURE 4*a* is a diagrammatic representation similar to that of FIGURE 4 showing an alternative winding arrangement;

FIGURE 5 is a schematic circuit diagram of another embodiment of this invention;

FIGURE 6 is an idealized graph of the hysteresis characteristic of the cores and of the relative amplitudes of magnetomotive forces applied to the cores used in FIGURE 5;

FIGURE 7 is an idealized graph of waveforms occurring in the circuit of FIGURE 5;

FIGURE 8 is a diagrammatic representation of the polarities of the windings and currents in the circuit of FIGURE 5; and FIGURE 9 is a block diagram illustrating an application of this invention.

Figure 1:
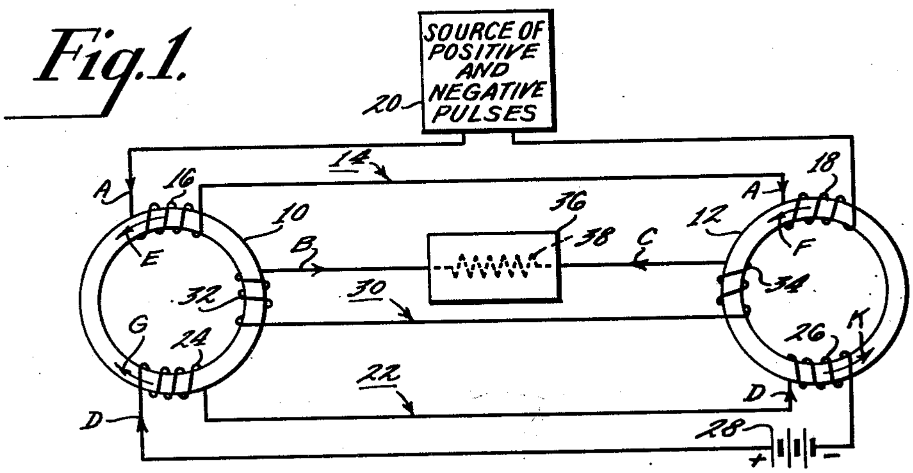

Referring to FIGURE 1, two magnetic cores 10, 12 are provided in accordance with this invention. An input coil 14 has windings 16, 18 linked respectively to the cores 10, 12 with the same direction of winding. A source of positive and negative pulses 20 is connected to the input coil 14. An inhibiting coil 22 has windings 24, 26 linked respectively to the cores 10, 12 and wound in opposite directions. A source of direct current 28, shown as a battery, is connected to the inhibiting coil 22. An output coil 30 has windings 32, 34 linked respectively to the cores 10, 12, and it is connected to a utilization device 36 the impedance 38 of which is represented by broken lines. The direction of winding of the first core 10 output winding 32 is the same as that of the first core 10 input winding 16; and the direction of winding of the second core 12 output winding 34 is opposite to that of the second core 12 input winding 18.

Figure 2:
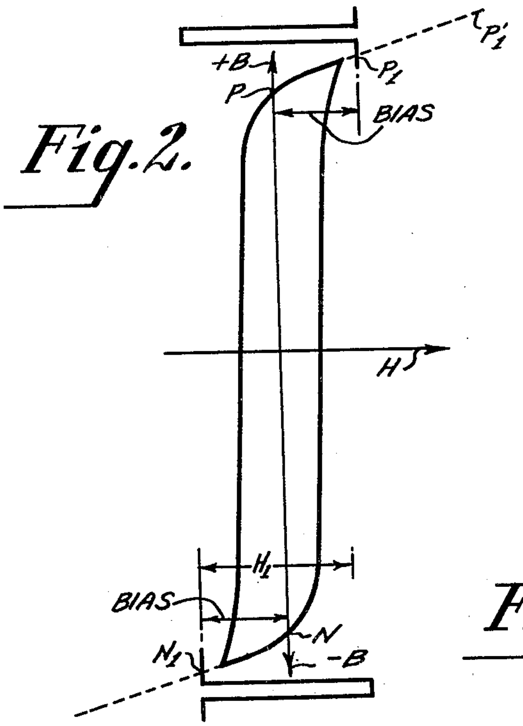
FIGURE 2 is an idealized graph of the hysteresis characteristic of magnetic cores used in the circuit of FIGURE 1.

The hysteresis characteristics of the two cores are substantially identical and are of generally rectangular shape, as shown in FIGURE 2. The first and second magnetic cores 10, 12 are biased to opposite states of saturation, the first core 10 at a point $N_1$ on the curve, and the second core 12 at a point $P_1$ on the curve. A magnetomotive force of $H_1$ is required to drive the first and second cores 10, 12 to the opposite states of saturation, points $P_1$ and $N_1$, respectively. If a magnetomotive force is applied to a core that is not greater than the bias, the core remains substantially unaffected in the initial state of saturation. The magnetomotive force $H_1$ corresponding to the amplitude of the input current pulses is also shown in FIGURE 2.

Figure 3:
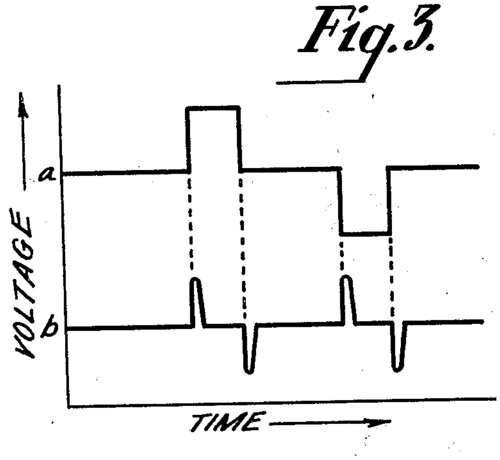
FIGURE 3 is an idealized graph of input and output waveforms in the circuit of FIGURE 1.

When a positive input current pulse is applied to the input coil 14 in the direction of the arrows A shown in FIGURE 1, the state of saturation of the first core 10 is reversed from $N_1$ to $P_1$ on the curve. As a result, a pulse in the direction of arrow B is induced in the first core 10 output winding 32. The input pulse in the second core input winding 18 tends to increase the state of saturation of the second core 12 a relatively small amount to the point $P'_1$, which leaves the state of the second core 12 substantially unchanged. The small change of flux B in the second core 12 induces a small pulse in the direction of arrow C in the second core 12 output winding 34 the polarity of which is opposite to that of the large pulse, arrow B, in the first core 10 output winding 32. The small pulse in the second core output winding 34 is negligibly small and may be disregarded. The condition of the circuit at this time is shown in FIGURE 1 by the current arrows A, B, C and D and by associated magnetomotive force arrows E, F, G, K. When the input pulse terminates, the biasing current in the inhibiting coil 22 restores the first and second cores 10, 12 to the respective initial states of saturation $N_1$, $P_1$. At that time, a second pulse is induced in the first core output winding 32 of opposite polarity to the first output pulse. The return of the second core 12 to its initial state of saturation $P_1$, induces a negligibly small pulse in the second core output winding 34 of opposite polarity to that in the first core output winding 32. In FIGURE 3, the input pulse waveforms are shown on line *a* and the output pulses are shown on line *b*.

When a negative pulse is applied to the input coil 14, the state of saturation of the second core 12 is reversed, and the first core 10 remains substantially unchanged. As a result, a pulse is induced in the second core output winding 34 when the second core 12 is turned over, and again when it is restored at the end of the input pulse. The second core 12 output and input windings 34, 18 have opposite directions of winding, while corresponding windings 32, 16 on the first core 10 have the same directions. Therefore, the pulses induced in the second core output winding 34 when the core 12 is turned over are of the same phase as those induced in the first core output winding 32 when the first core 10 is turned over. In either case, the leading edge of a pulse produces a positive pulse in the output coil 30, and the trailing edge produces a negative pulse. The output is the same for positive and negative inputs. The presence of a pulse is marked without regard to its polarity.

In FIGURE 4, the horizontal rectangles represent the magnetic cores 10, 12, the vertical lines represent the coils 14, 22, 30, and the oblique lines represent the senses of linkage of the coil windings on the respective cores 10, 12. On the first core 10, the input and output windings 16, 32 have the same sense of linkage, and the inhibiting winding 24 has the opposite sense of linkage. On the second core 12, the input and inhibiting windings 18, 26 have the same sense of linkage, and the output winding 34 has the opposite sense of linkage. If the senses of linkage of the output windings on both cores 10, 12 are reversed, as indicated in FIGURE 4*a* for another output coil 40, the outputs corresponding to positive and negative input pulses would still have the same phase. However, the order of the output pulses would be reversed from those shown in line *b* of FIGURE 3, with the negative output pulse corresponding to the leading pulse edge and the positive output pulse corresponding to the trailing pulse edge.

Referring to FIGURE 5, a second embodiment of the invention is shown. Two magnetic cores 10, 12 are wound with input coil 14 windings 16, 18, inhibiting coil 22 windings 24, 26, and output coil 30 windings 32, 34 in the same manner as in FIGURE 1. In addition, a gating coil 42 is provided that has windings 44, 46 respectively on the first and second cores 10, 12. The gating coil 42 windings 44, 46 and the inhibiting coil windings 24, 26 on the same cores 10, 12, have opposite senses of linkage, as indicated by the magnetomotive force arrows G, K, L, M. A source 48 of gating pulses is connected to the gating pulse coil 42. FIGURE 8 shows diagrammatically the relative senses of linkage of the windings in FIGURE 5.

The hysteresis graph of FIGURE 6 shows the relative amplitudes of the magnetomotive forces produced by the input pulse, the gating pulse and the biasing current. The first and second cores 10, 12 are biased to opposite states of saturation, points $N_2$ and $P_2$, respectively. The biasing magnetomotive forces are equal, and each is greater than the magnetomotive force produced by the input pulse or gating pulse alone. The combined input and gating magnetomotive forces if they are in the same direction are sufficient to overcome the bias and drive the cores 10, 12 to the opposite states of saturation, $P_1$ and $N_1$ respectively.

The waveforms of the circuit are shown in FIGURE 7, line *c* representing the input pulses, line *d* a gating pulse, and line *e* the output pulses. When a positive input pulse is applied to the input coil and coincides with a gating pulse, the first core 10 is turned over and the second core 12 remains substantially unchanged. This is the circuit condition indicated by the current and magnetomotive force arrows in FIGURE 5. A positive pulse is induced in th first core output winding 32. Upon termination of the positive input pulse, the biasing magnetomotive force restores the first core 10 to its initial state, and a negative pulse is induced in the first core output winding 32. If a negative pulse is applied to the input coil and coincides with a gating pulse, the same output is produced in the second core output winding 34 by a reversal of the state of the second core 12. If a pulse of positive or negative polarity is applied to the input coil 14 in the absence of a gating pulse, the amplitude of the pulse is insufficient to reverse the state of saturation of either core 10, 12 and merely produces a minor disturbance in the core. As a result, pulses of negligible amplitude are induced in the output coil 30. Therefore, gated input pulses are marked, and ungated pulses are effectively blocked.

Referring to FIGURE 9, an application of the pulse marking circuit of FIGURE 1 is shown. A portion of a magnetic memory 50 of the type described in the above cited articles and copending patent application of Jan A. Rajchman, Serial No. 275,621, entitled "Magnetic Information Handling System," is made up of a plurality of magnetic cores 52 arranged in rows and columns. Each row of cores 52 is linked by a separate row selecting coil 54, and each column of cores is also linked by a separate column selecting coil 56. The senses of linkage of all the row selecting coils 54 are the same, and the senses of linkage of all the column selecting coils 56 are the same. All of the cores 52 are also linked by a single read-out coil 58 in checkerboard fashion. As a result of this linkage, no two adjacent cores in the same row or column have the same sense of linkage to the read-out coil 58. The static magnetic memory 50 read-out coil 58 is connected in series with the input coil 14 of a pulse marking circuit 60, which is the same as that shown in FIGURE 1. The output coil 30 of the pulse marking circuit is connected to a gate 62 which receives a gating pulse from an appropriate source (not shown). The gate 62 may be a multigrid tube (not shown). The output of the gate 62 is applied to a pulse forming circuit 64 which may be a univibrator (not shown).

All of the cores 52 in the magnetic memory are magnetized to one or the other states of remanant induction represented by points P and N on the hysteresis loop of FIGURE 2. In this state, the magnetic cores 52 are holding information previously stored. In order to read out this information in a particular core 52, positive pulses of current are simultaneously applied to the row and column selecting coils 54, 56 for that core. This is shown in FIGURE 9, by way of example, for the core 52 in the left hand column and bottom row. Assuming that this particular core 52 is in the N state of remanant induction, the amplitudes of the two selecting current pulses additively produced sufficient magnetomotive force to drive that core 52 to the opposite state of saturation P. This induces a pulse in the read-out coil 58. In order to reinsert the information back in the same core 52, negative pulses are applied to the same selecting coils 54, 56. The state of saturation of that core 52 is again reversed, and an opposite polarity pulse is induced in the read-out coil 58. All the other memory cores 52 only receive, at most, magnetomotive forces corresponding to single pulses which are insufficient to turn over the cores. However, the single pulses produce relatively small disturbances in the cores that, in turn, induce small pulses in the read-out coil 58. By winding the read-out coil 58 in checkerboard fashion through the cores, the small disturbance pulses are of opposite polarities and tend to cancel each other. This has the desired effect of a relatively large signal-to-noise ratio.

As a result of the checkerboard winding of the read-out coil 58, the read-out pulses are of different polarities depending upon which one of the cores 52 is turned over. Thus, for each pair of positive and negative selecting coil 54, 56 pulses that are applied, there correspond two different possible forms of read-out pulse pairs. One pair is a positive and a negative pulse, in that order, and the other pair is a negative and a positive pulse. The different read-out pulse pairs are indicated at the input to the pulse marking circuit 60. The output of the pulse marking circuit 60 is a set of positive and negative pulses for each read-out pulse. Each output pulse set is the same whatever the polarity of the read-out pulses. Only one of the two sets of positive and negative pulses from the pulse marking circuit 60 is needed for information purposes. Thus, one pulse set is gated through the gate 62, and the other pulse is blocked. The pulse former circuit 64 may be arranged to be responsive only to positive pulses so that only a single output pulse is produced for each set of input pulses. The pulse from the pulse former 64 is the same standard pulse for both positive and negative read-out pulses. The gating function is incorporated in the second embodiment of the invention shown in FIGURE 5. Therefore, by using the gated pulse marking circuit in the application shown in FIGURE 9, the gate circuit 62 may be omitted.

It is evident from the above description of this invention that a circuit employing magnetic cores has been provided for producing uniform signals in response to signals of opposite polarities. The circuit is simple, reliable, and economical in the components required.

What is claimed is:

1. A signal responsive circuit comprising a plurality of magnetic cores having rectangular hysteresis characteristics, an input coil having windings linked to said cores, means including inhibiting windings linked to said cores for applying thereto magnetomotive forces of substantially the same magnitude, said inhibiting and input windings linked to a first one of said cores having opposite senses of linkage, said inhibiting and input windings linked to a second one of said cores having the same sense of linkage, means for supplying pulses of opposite polarities to said input coil, and an output coil having windings linked to said cores.

2. A signal responsive circuit as recited in claim 1 wherein said output coil windings and said input windings linked to one and said output and input windings linked to the other of said cores have the same and opposite senses of linkage, respectively.

3. A signal responsive circuit comprising a plurality of magnetic cores each having two states of substantial saturation, an input coil having windings linked to said cores, means including inhibiting windings linked to said cores for applying thereto magnetomotive forces of substantially the same magnitude, said inhibiting and input windings linked to a first one of said cores having opposite senses of linkage, said inhibiting and input windings linked to a second one of said cores having the same sense of linkage, an output coil having windings linked to said cores, and means including gating windings linked to said cores for applying magnetomotive forces thereto, said gating and inhibiting windings on the same core having opposite senses of linkage.

4. A signal responsive circuit comprising a plurality of magnetic cores each having two states of substantial saturation, an input coil having windings linked to said cores, means including inhibiting windings linked to said cores for applying thereto magnetomotive forces of substantially the same magnitude, said inhibiting and input windings linked to a first one of said cores having opposite senses of linkage, said inhibiting and input windings linked to a second one of said cores having the same sense of linkage, means for applying input pulses of opposite polarities to said input coil, and an output coil having windings linked to said cores.

5. A signal responsive circuit comprising a plurality of magnetic cores each having two states of substantial saturation, an input coil having windings linked to said cores, an inhibiting coil having windings linked to said cores, said inhibiting and input windings linked to a first one of said cores having opposite senses of linkage, said inhibiting and input windings linked to a second one of said cores having the same sense of linkage, means for applying input pulses of opposite polarities to said input coil, and an output coil having windings linked to said cores.

6. A signal responsive circuit comprising a plurality of magnetic cores each having two states of substantial saturation, a single input coil having windings linked to said cores, means including inhibiting windings linked to said cores for applying thereto magnetomotive forces of substantially the same magnitude, said inhibiting and input windings linked to a first one of said cores having opposite senses of linkage, said inhibiting and input windings linked to a second one of said cores having the same sense of linkage, means for supplying input pulses of opposite polarities to said input coil, and an output coil having windings linked to said cores.

7. A signal responsive circuit for producing uniform output signals in response to pulses of opposite polarities comprising a plurality of saturable magnetic cores, an input coil having windings linked to said cores, means including an inhibiting coil having windings linked to said cores for simultaneously applying thereto magnetomotive forces of substantially the same saturating magnitude, said inhibiting and input windings linked to a first one of said cores having opposite senses of linkage, said inhibiting and input windings linked to a second one of said cores having the same sense of linkage, means for applying input pulses of opposite polarities to said input coil, and an output coil having windings linked to said cores, said output and input windings linked to one and said output and input windings linked to the other of said first and second cores having the same and opposite senses of linkage respectively.

8. A signal responsive circuit as recited in claim 7 wherein said output and input windings linked to said first and second cores have respectively the same and opposite senses of linkage.

9. A signal responsive circuit as recited in claim 7 wherein said output and input windings linked to said first and second cores have respectively opposite and the same senses of linkage.

10. A signal responsive circuit comprising a plurality of saturable magnetic cores, an input coil having windings linked to said cores, means including an inhibiting coil having windings linked to said cores for simultaneously applying thereto magnetomotive forces of substantially the same saturating magnitude, said inhibiting and input windings linked to a first one of said cores having opposite senses of linkage, said inhibiting and input windings linked to a second one of said cores having the same sense of linkage, means for applying input pulses of opposite polarities to said input coil, an output coil having windings linked to said cores, said output and input windings linked to one and said output and input windings linked to the other of said first and second cores having the same and opposite senses of linkage respectively, and means including a gating coil having windings linked to said cores for applying magnetomotive forces thereto, said gating and inhibiting windings on the same core having opposite senses of linkage.

11. In combination with a source of pulses of opposite polarities, a circuit for producing uniform output signals in response to said opposite polarity pulses, said circuit comprising a plurality of saturable magnetic elements, input windings linked to said elements and connected to said source to receive said pulses, means including inhibiting windings linked to said elements for applying thereto magnetomotive forces of the same magnitude, said input and inhibiting windings linked to a first one of said elements having opposite senses of linkage, said input and inhibiting windings linked to a second one of said elements having the same sense of linkage, and an output coil having windings linked to said elements, said output and input windings linked to one and said output and input windings linked to the other of said elements having the same and opposite senses of linkage respectively.

12. An impulse responsive unit comprising first and second magnetic binary elements, means for maintaining said first magnetic binary element in a reset state and said second magnetic binary element in a set state except during predetermined intervals, and means associated with said magnetic binary elements for changing the state of one of said magnetic binary elements in response to an impulse of predetermined polarity received during one of said predetermined intervals and the state of the other of said magnetic binary elements in response to an impulse of a polarity opposite that of said predetermined polarity received during one of said predetermined intervals.

13. An impulse responsive unit comprising first and second magnetic binary elements, means for maintaining said first magnetic binary element in a negative saturated state and said second magnetic binary element in a positive saturated state except during predetermined intervals, and means associated with said magnetic binary elements for changing the state of said first magnetic binary element in response to an impulse of negative polarity received during one of said predetermined intervals and the state of said second magnetic binary element in response to an impulse of positive polarity received during one of said predetermined intervals.

14. An impulse responsive unit comprising first and second magnetic binary elements, means for maintaining said first magnetic binary element in a reset state and said second magnetic binary element in a set state, a gating impulse source for supplying gating impulses to enable said magnetic binary elements to change state, means associated with said first magnetic binary element for changing the state of said magnetic binary element in response to an impulse of predetermined polarity and a gating impulse and for changing the state of said second magnetic binary element in response to an impulse of a polarity opposite that of said predetermined polarity and a gating impulse.

15. An impulse responsive unit comprising first and second magnetic binary elements, a gating impulse source to enable said magnetic binary elements to change state, means for always maintaining said first magnetic binary element in a saturated reset state and said second magnetic binary element in a saturated set state in the absence of gating impulses, and means associated with said first magnetic binary element for changing the state of said first magnetic binary element in response to an impulse of predetermined polarity and a gating impulse and for changing the state of said second magnetic binary element in response to an impulse of a polarity opposite that of said predetermined polarity and a gating impulse.

16. An impulse responsive unit comprising first and second magnetic binary elements, a gating impulse source, means for maintaining said first magnetic binary element in a reset state and said second magnetic binary element in a set state in the absence of gating impulses, means ciated with said second magnetic binary element for changing the state of said first magnetic binary element in response to the simultaneous presence of a gating impulse and an impulse of predetermined polarity, and means associated with said second magnetic binary elment for changing the state of said second magnetic binary element in response to the simultaneous presence of a gating impulse and an impulse of a polarity opposite that of said predetermined polarity.

17. A gating unit for passing positive or negative signals when gating signals are present comprising first and second magnetic binary element, means for maintaining said first magnetic binary element in a reset state and said second magnetic binary element in a set state, and means associated with said magnetic binary elements and responsive to the gating signals for changing the state of one of said magnetic binary elements in response to a signal of predetermined polarity and the state of the other of said magnetic binary elements in response to a signal of a polarity opposite that of said predetermined polarity.

18. An impulse responsive unit comprising first and second magnetic binary elements, means for maintaining said first magnetic binary element in a saturated reset state and said second magnetic binary element in a saturated set state, means associated with said magnetic binary elements for changing the state of one of said magnetic binary elements in response to an impulse of predetermined polarity and the state of the other of said magnetic binary elements in response to an impulse of a polarity opposite that of said predetermined polarity, and means associated with said magnetic binary elements for producing an output impulse of predetermined polarity when either of said magnetic binary elements changes state.

19. An impulse responsive unit comprising first and second magnetic binary elements, a gating impulse source, means for maintaining said first magnetic binary element in a reset state and said second magnetic binary element in a set state in the absence of gating impulses, means associated with said magnetic binary elements for changing the state of one of said magnetic binary elements in response to the simultaneous presence of a gating impulse and an impulse of predetermined polarity and the state of the other of said magnetic binary elements in response to the simultaneous presence of a gating impulse and an impulse of a polarity opposite that of said predetermined polarity, and means associated with said magnetic binary elements for producing an output impulse of predetermined polarity when either of said magnetic binary elements changes state.

20. An impulse responsive unit comprising first and second magnetic binary elements, means for maintaining said first magnetic binary element in a saturated reset state and said second magnetic binary element in a saturated set state, means associated with said magnetic binary elements for changing the state of one of said magnetic binary elements in response to an impulse of positive polarity and the state of the other of said magnetic binary elements in response to an impulse of negative polarity, and means associated with said magnetic binary elements for producing an output impulse of predetermined polarity when either of said magnetic binary elements changes state.

21. An impulse responsive unit comprising first and second magnetic binary elements, means for maintaining said first magnetic binary element in a reset state and said second magnetic binary element in a set state, means associated with said magnetic binary elements for changing the state of said first magnetic binary element in response to an impulse of negative polarity and the state of said second magnetic binary element in response to an impulse of positive polarity, and means associated with said magnetic binary elements for producing an output impulse of positive polarity when either of said magnetic binary elements changes state.

22. An impulse responsive unit comprising first and second magnetic binary elements, a gating pulse source, means for maintaining said first magnetic binary element in a reset state and said second magnetic binary element in a set state, means associated with said magnetic binary elements for changing the state of said first magnetic binary element in response to a gating pulse and a pulse of negative polarity and the state of the other of said magnetic binary elements in response to a gating pulse and a pulse of positive polarity, and means associated with said magnetic binary elements for producing an output impulse of positive polarity when either of said magnetic binary elements changes state.

23. Apparatus for gating input pulses by means of gating pulses and producing an output pulse during the simultaneous presence of an input pulse and a gating pulse comprising first and second magnetic cores each having an input, a gating and an output winding, said first magnetic core always being in a reset condition and said second magnetic core in a set condition in the absence of gating pulses, said gating windings being responsive to the presence of gating pulses to enable both of said magnetic cores to change condition, said input and gating windings of said first magnetic core being responsive to the simultaneous presence of an input pulse of predetermined polarity and a gating pulse respectively to change said first magnetic core to a set condition, said input and gating windings of said second magnetic core being responsive to the simultaneous presence of an input pulse of polarity opposite that of said predetermined polarity and a gating pulse respectively to change said second magnetic core to a reset condition, and output pulse appearing at the associated output winding when one of said magnetic cores changes condition.

24. Apparatus for gating both positive and negative input pulses by means of gating pulses and producing an output pulse during the simultaneous presence of an input pulse and a gating pulse comprising first and second magnetic cores each having an input, a gating and an output winding, said first magnetic core always being in a reset condition and said second magnetic core always being in a set condition in the absence of gating pulses, said gating windings being responsive to the presence of gating pulses to permit said magnetic cores to change condition, said input and gating windings of said first magnetic core being responsive to the simultaneous presence of a negative pulse and a gating pulse respectively to change said first magnetic core to a set condition, said input and gating windings of said second magnetic core being responsive to the simultaneous presence of a positive pulse and a gating pulse respectively to change said second magnetic core to a reset condition, an output pulse appearing at the associated output winding when one of said magnetic cores changes condition.

References Cited in the file of this patent

UNITED STATES PATENTS

| | | |
|---|---|---|
| 2,591,406 | Carter et al. | Apr. 1, 1952 |
| 2,666,151 | Rajchman et al. | Jan. 12, 1954 |
| 2,673,337 | Avery | Mar. 23, 1954 |
| 2,680,819 | Booth | June 8, 1954 |
| 2,709,225 | Pressman | May 24, 1955 |

Disclaimer 3,008,062.—*William Kober*, Fairport, N.Y. DYNAMOELECTRIC MACHINE. Patent dated Nov. 7, 1961. Disclaimer filed Jan. 31, 1964, by the assignee, *TKM Electric Corp.*

Hereby enters this disclaimer to claim 11 of said patent.

[*Official Gazette May 5, 1964.*]